United States Patent
Ishikawa et al.

(10) Patent No.: US 9,903,985 B2
(45) Date of Patent: Feb. 27, 2018

(54) INFRARED APPARATUS

(71) Applicant: DENSO CORPORATION, Kariya, Aichi-pref. (JP)

(72) Inventors: Ryusuke Ishikawa, Kariya (JP); Yonosuke Koyama, Kariya (JP); Makoto Hatano, Kariya (JP); Seizaburou Kawashima, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/436,921

(22) PCT Filed: Nov. 5, 2013

(86) PCT No.: PCT/JP2013/006512
§ 371 (c)(1),
(2) Date: Apr. 20, 2015

(87) PCT Pub. No.: WO2014/083774
PCT Pub. Date: Jun. 5, 2014

(65) Prior Publication Data
US 2015/0268388 A1    Sep. 24, 2015

(30) Foreign Application Priority Data

Nov. 28, 2012  (JP) ................................. 2012-259693

(51) Int. Cl.
*G02B 5/00* (2006.01)
*B29C 65/16* (2006.01)
(Continued)

(52) U.S. Cl.
CPC .............. *G02B 5/00* (2013.01); *B23K 26/127* (2013.01); *B29C 65/1616* (2013.01);
(Continued)

(58) Field of Classification Search
CPC .. G02B 5/003; G02B 19/009; G02B 19/0085; G02B 6/4237; G02B 6/2551
See application file for complete search history.

(56) References Cited

U.S. PATENT DOCUMENTS

| | | | |
|---|---|---|---|
| 2005/0119377 A1* | 6/2005 | Ishii | B29C 66/73921 524/88 |
| 2009/0275678 A1* | 11/2009 | Kumazawa | C08L 67/00 523/523 |
| 2013/0306868 A1* | 11/2013 | Yamazaki | G01J 5/045 250/338.1 |

FOREIGN PATENT DOCUMENTS

| JP | 06-160176 A | 6/1994 |
|---|---|---|
| JP | 07-7015 U | 1/1995 |

(Continued)

OTHER PUBLICATIONS

International Search Report and Written Opinion of the International Searching Authority dated Feb. 10, 2014 in the corresponding International application No. PCT/JP2013/006512 (and English translation).

*Primary Examiner* — Darryl J Collins
*Assistant Examiner* — Journey Sumlar
(74) *Attorney, Agent, or Firm* — Posz Law Group, PLC

(57) ABSTRACT

An infrared apparatus includes a case, and an infrared device to input and/or output infrared rays. In the infrared apparatus in which the infrared device is received in the case, the case has an infrared transmitting window part which transmits only infrared light and which does not transmit visible light. Of a light transmitting resin through which near-infrared laser used for near-infrared laser welding passes and a light absorbing resin which emits heat and melts when receiving the near-infrared laser, the infrared transmitting window part is made of the light transmitting resin.

11 Claims, 5 Drawing Sheets

(51) Int. Cl.
  *B29C 65/00*   (2006.01)
  *B23K 26/12*   (2014.01)
  *B29L 31/00*   (2006.01)
  *B29L 31/34*   (2006.01)

(52) U.S. Cl.
  CPC ...... *B29C 65/1635* (2013.01); *B29C 66/1142* (2013.01); *B29C 66/542* (2013.01); *B29C 66/733* (2013.01); *B29C 65/1677* (2013.01); *B29C 66/71* (2013.01); *B29C 66/73115* (2013.01); *B29C 66/73321* (2013.01); *B29C 66/73921* (2013.01); *B29C 66/8322* (2013.01); *B29K 2995/0027* (2013.01); *B29L 2031/3481* (2013.01); *B29L 2031/747* (2013.01)

(56) References Cited

FOREIGN PATENT DOCUMENTS

| | | | |
|---|---|---|---|
| JP | H077015 U | * | 1/1995 |
| JP | 2001-103010 A | | 4/2001 |
| JP | 2007-112126 A | | 5/2007 |
| JP | 2007112126 A | * | 5/2007 |
| JP | 2010-201695 A | | 9/2010 |
| JP | 2010-225429 A | | 10/2010 |
| JP | 2013-211152 A | | 10/2013 |
| JP | 5939385 B2 | * | 6/2016 ............. G01J 5/045 |

* cited by examiner (a)

(b)

(c)

(a)

(b)

(c)

US 9,903,985 B2

INFRARED APPARATUS

CROSS REFERENCE TO RELATED APPLICATION

This application is a U.S. national stage of International Application No. PCT/JP2013/006512 filed on Nov. 5, 2013 and is based on Japanese Patent Application No. 2012-259693 filed on Nov. 28, 2012, the disclosures of which are incorporated herein by reference.

TECHNICAL FIELD

The present disclosure relates to an infrared apparatus which inputs and/or outputs infrared rays.

BACKGROUND ART

An infrared apparatus has a case in which an infrared outputting device or infrared receiving device is arranged. The case has an infrared transmission window part through which only infrared light passes and visible light does not pass. Conventionally, visible light cut resin material is used for the window part, that is different from a case material met for mechanical requirement such as strength (for example, Patent Literature 1).

PRIOR ART LITERATURES

Patent Literature

Patent Literature 1: JP 2001-103010 A

SUMMARY OF INVENTION

However, in the above case of the conventional structure, since the window part and the case are made of materials different from each other, the structure becomes complicated for assembling them to each other and the number of processes for the assembling also increases. Moreover, the visible light cut resin material is expensive, so the material cost also increases. Furthermore, when the case is made to have waterproof structure with protection against dust, it is necessary to arrange a gasket between the different materials or to integrally mold them, so the structure will become more complicated and the number of processes for the assembling will also increase.

The present disclosure is aimed to provide an infrared apparatus that can be easily assembled and that satisfies a conventional strength and light transmitting requirements.

In order to meet the above-mentioned objective, the infrared apparatus of the present disclosure includes a case and an infrared device received in the case to input and/or output infrared rays.

The case has an infrared transmission window part through which infrared light passes, and the infrared transmission window part is made of a light transmitting resin through which near-infrared laser used for near-infrared laser welding passes.

According to the configuration of the present disclosure, when a case main part of the case except the infrared transmission window part is made of a light absorbing resin which generates heat and melts by receiving the near-infrared laser, the infrared transmission window part and the case main part can be easily joined and fixed by the near-infrared laser welding. Furthermore, when a resin material to be main is made common between the light transmitting resin and the light absorbing resin, the infrared transmission window part and the case main part are not only integrally fixed but also are made of the same ingredient, so as to provide one object made of the same material in the strongly fixed state.

In addition, the laser welding here means a welding using what is called a laser transmission welding method (Laser Transmission Welding). First of all, a light transmitting resin part through which laser beam passes is stacked on a light absorbing resin part which absorbs laser beam. Next, pressure is applied to the surfaces to be joined with each other and laser beam irradiated. Thereby, the irradiated laser beam passes through the light transmitting resin part, and heat is generated near the border surface adjacent to the light absorbing resin part. The light absorbing resin part melts with the heat, and is joined to the light transmitting resin part.

DESCRIPTION OF EMBODIMENTS

Hereafter, an infrared apparatus according to an embodiment of the present disclosure is described with reference to drawings.

Figure 1:
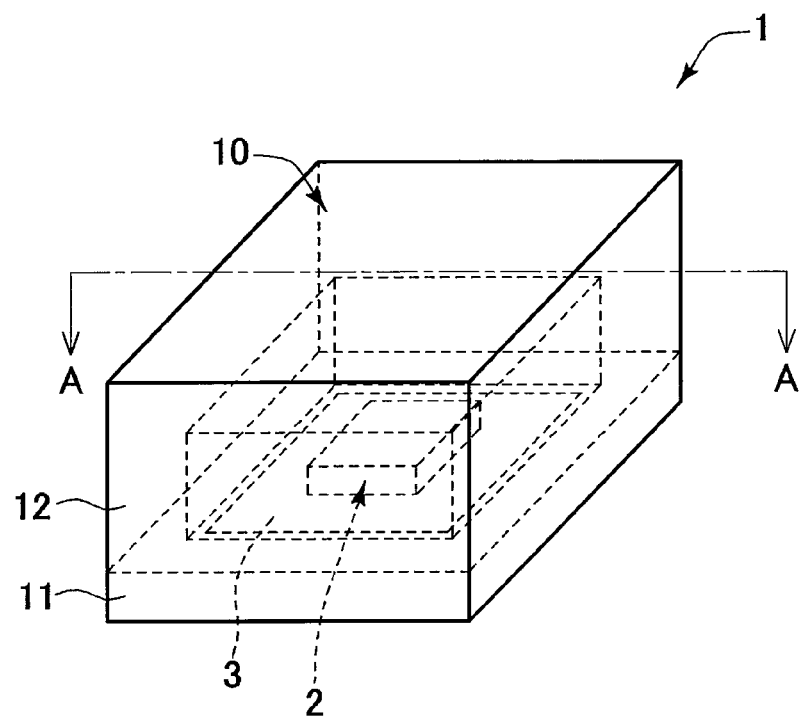
FIG. 1 is a schematic perspective view illustrating an infrared apparatus according to an embodiment of the present disclosure.

As shown in FIG. 1, an infrared apparatus 1 receives an infrared device 2 which inputs and/or outputs infrared rays in a case 10. The infrared device 2 is, for example, at least one of an infrared output device 2A, an infrared input device 2B, and an infrared output and input device 2C.

The case 10 has a case main part 11 and an infrared transmission window part 12 which does not transmit visible light and which transmits infrared light. The case main part 11 is a residual section except the infrared transmission window part 12, in the case 10. The infrared device 2 that is mounted on a circuit board 3 is disposed at the center on the upper surface of the case main part 11. The infrared transmission window part 12 covers the infrared device 2 and the circuit board 3 from the upper side, which are accommodated in the case interior space 10S, and is fixed to the case main part 11 as a lid part.

Figure 2:
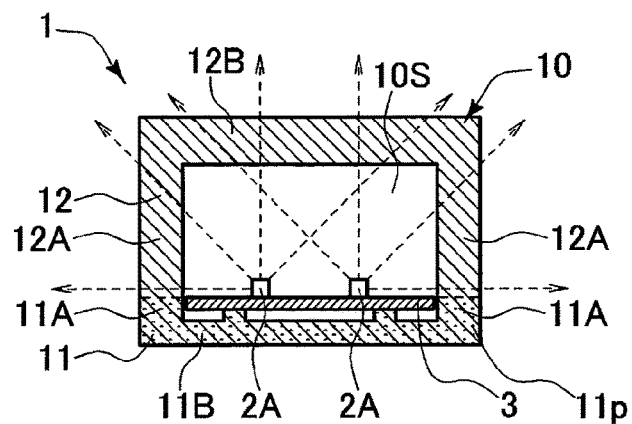
FIG. 2 is a schematic sectional view illustrating a first aspect of the infrared apparatus of FIG. 1, at the central perpendicular section (A-A section) of FIG. 1.
Figure 3:
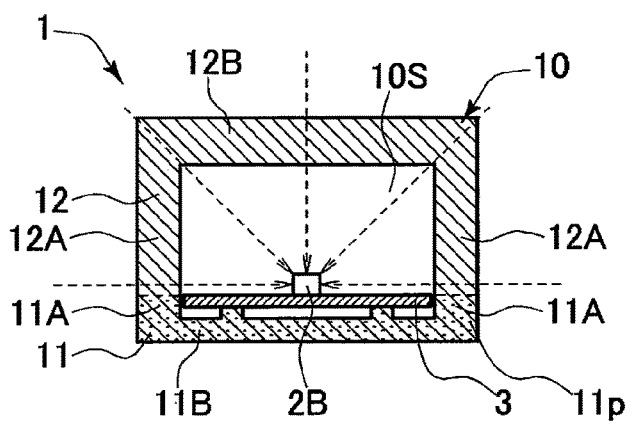
FIG. 3 is a schematic sectional view illustrating a second aspect of the infrared apparatus of FIG. 1, at the central perpendicular section (A-A section) of FIG. 1.
Figure 4:
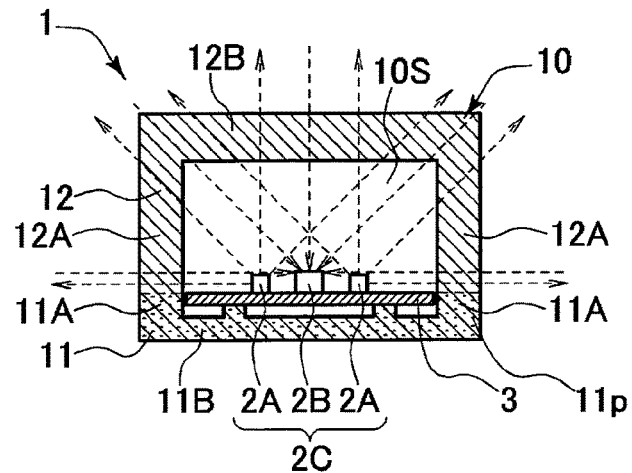
FIG. 4 is a schematic sectional view illustrating a third aspect of the infrared apparatus of FIG. 1, at the central perpendicular section (A-A section) of FIG. 1.

As shown in FIGS. 2-4, at least one of the infrared output device 2A and the infrared input device 2B is provided on the upper surface of the case main part 11 with the circuit board 3, and the case main part 11 defines a bottom part of the whole case 10. In contrast, the infrared transmission window part 12 is disposed and fixed on the outer periphery of the upper surface of the case main part 11 in contact state, and defines the lid part of the case 10 that covers the infrared output device 2A, the infrared input device 2B, and the circuit board 3 from the upper side. The case 10 is formed such that the infrared transmission window part 12 corresponding to a lid part is fixed to the case main part 11 corresponding to a bottom part.

Figure 5:
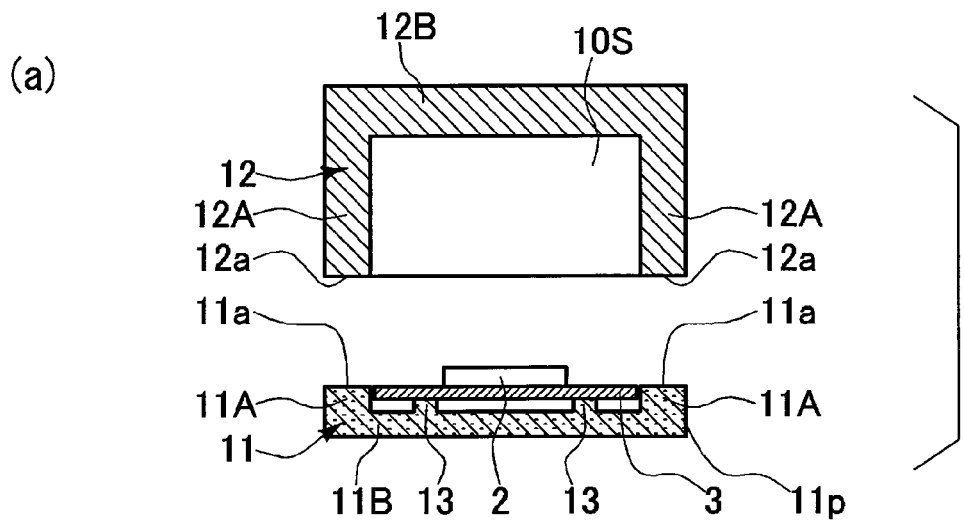
FIG. 5 is an explanatory view illustrating a flow of method for assembling the infrared apparatus of FIGS. 2-4, using the central perpendicular section (A-A section) of FIG. 1.
Figure 5:
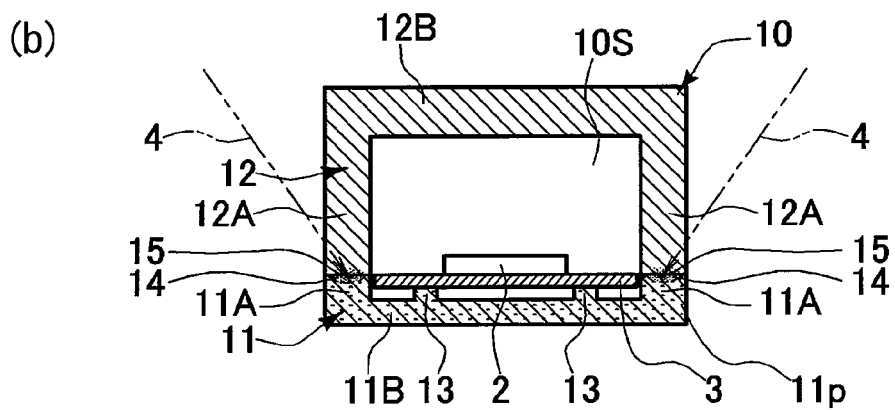
Figure 5:
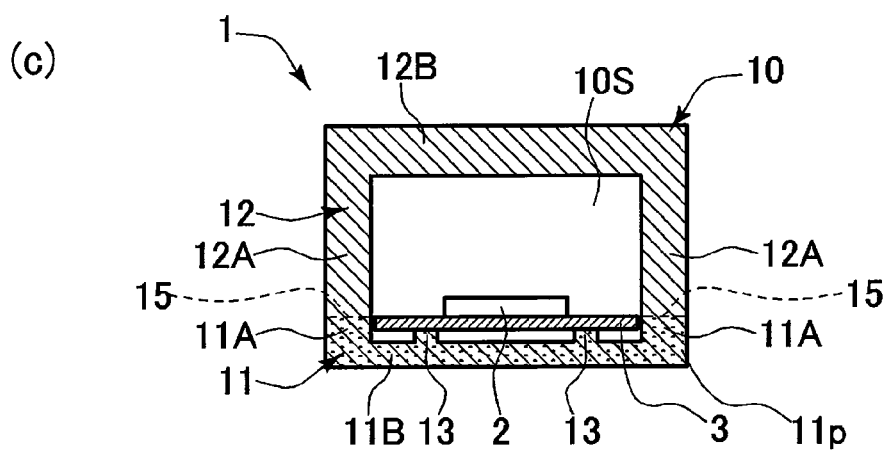

Specifically, as shown in FIGS. 2-4, the infrared transmission window part 12 is shaped to have a cylindrical wall part 12A which extends upward from the outer periphery of the upper surface of the case main part 11 corresponding to a bottom part, and an upper end part 12B opposing the case main part 11 through the case interior space 10S at the upper end of the cylindrical wall part 12A. In contrast, the case main part 11 is shaped as a box in which the upper part is opened at the center, and has a bottom part 11B and a cylindrical wall part 11A extending upward from the outer periphery of the upper surface of the bottom part 11B. The infrared device 2 mounted on the circuit board 3 is arranged and fixed inside of the case interior space 10S with the upper open space. As shown in FIG. 5, the circuit board 3 is disposed on plural projection parts 13 projected from the upper surface of the bottom part 11B, and the projection part 13 and the circuit board 3 are fixed to each other by a fastening member such as screw.

Thereby, infrared rays pass through the infrared device 2 not only from the upper side but from the outer periphery side. In case where the infrared device 2 is the infrared output device 2A, infrared rays can be output within a wide angle. In case where the infrared device 2 is the infrared input device 2B, infrared rays can be input from a wide angle.

In addition, the infrared device 2 is a common device such as infrared transmission device represented by the standard of IrDA (Infrared Data Association), infrared remote-control device, or infrared sensor, and is arranged in the case 10 to define the infrared apparatus 1. The infrared device 2 may be any of the infrared output device 2A outputting infrared rays shown in FIG. 2, (for example, infrared signal sending device having a sending portion that sends an infrared signal), the infrared input device 2B inputting infrared rays shown in FIG. 3, (for example, infrared signal receiving device having a receiving portion that receives an infrared signal), and the infrared output and input device 2C which performs both of output and input of infrared rays as show in FIG. 4 (for example, infrared signal sending and receiving device that sends and receives an infrared signal), or may be other device using infrared rays passing through the infrared transmission window part 12.

The case 10 is produced by joining and fixing the infrared transmission window part 12 and the case main part 11 with near-infrared laser welding. The near-infrared laser used for laser welding is an electromagnetic wave with a wavelength of 0.7-2.5 micrometers, and YAG laser (wavelength: 1064 nm etc.) or LD laser (semiconductor laser: wavelength: 808 nm, 840 nm, 940 nm, etc.) may be used. The infrared device 2 may be an infrared transmission device. Since the wavelength band of the infrared transmission IrDA is in a near-infrared region (from about 850 nm), welding with infrared LD laser can be performed. The output condition of the laser in this case is determined depending on the transmissivity and thickness of light absorbing resin or light transmitting resin, and a laser with output of several tens Wattage to about 100 W can be used.

The joining and fixing method by the near-infrared laser welding is explained using FIG. 5.

The infrared transmission window part 12 is made of light transmitting resin which transmits the near-infrared laser used for the near-infrared laser welding as the material. The light transmitting resin is a near-infrared laser transmitting resin through which the near-infrared laser passes in the near-infrared laser welding, and it is desirable to have the transmissivity, for example, higher than or equal to 20% such that the resin easily transmits infrared rays. For example, polybutylene terephthalate (PBT resin) etc. can be used as a resin material to be main in the light transmitting resin. Moreover, the resin material to be main may contain a coloring material or a filler while the resin has transmission performance more than or equal to a fixed level.

The case main part 11 is made of light absorbing resin which generates heat and melts by absorbing near-infrared laser when receiving the near-infrared laser used for the near-infrared laser welding. The light absorbing resin is a near-infrared laser absorbing resin which absorbs near-infrared laser and generates heat in the near-infrared laser welding, and may be other resin that absorbs near-infrared laser and generates heat. Moreover, it is necessary to have a low warpage for a secured junction, and it is desirable that the clearance defined between the light absorbing resin and the light transmitting resin (infrared transmission window part 12) as common difference is smaller than or equal to 0.1 mm, at least. For example, polybutylene terephthalate (PBT resin) etc. can be used as a resin material to be main in the light absorbing resin. In the present embodiment, function-enhanced resin containing filler such as glass fiber may be used from a viewpoint that the circuit board 3 is fixed. A predetermined laser absorption material 11p which absorbs near-infrared laser is contained in the main resin material so as to provide the light absorbing resin. The laser absorption material 11p is, for example, carbon. Specifically, as the laser absorption material 11p, for example, laser absorption pigment, paint-base absorption pigment such as carbon black, dye-base absorption pigment, or the combination thereof may be used. In addition, when the main resin material is made to contain laser absorption pigment, coloring material, or filler, it is necessary to set the combination and the quantity not to generate degradation by excessive heat in the main resin material at the time of joining, in consideration of laser absorption and heat emitting performance of the contained material.

The resin material to be main in the light transmitting resin and the light absorbing resin is common thermoplastic resin. Polybutylene terephthalate resin is adopted as the common resin material common between the light transmitting resin and the light absorbing resin of the present embodiment.

The infrared transmission window part 12 made of light transmitting resin which transmits near-infrared laser is, firstly at the time of joining and fixing, arranged onto the case main part 11, on which the infrared device 2 (with the circuit board 3) is already mounted to overlap, made of light absorbing resin which absorbs near-infrared laser.

Next, the near-infrared laser 4 is irradiated to the contact surfaces 11a, 12a (surfaces to be joined) with each other. That is, the near-infrared laser 4 is irradiated to the contact surface 11a of the case main part 11 such that the near-infrared laser 4 passes through the inside of the infrared transmission window part 12 toward the contact surface 12a. At this time, pressure is applied to the infrared transmission window part 12 and the case main part 11 in a mutually approaching direction.

Thereby, the case main part 11 made of the light absorbing resin generates heat near the contact surface 11a which defines a border plane of the case main part 11, and a melt part 14 is generated by melting the resin with the generated heat. On the opposite side, a melt part 15 is also generated near the contact surface 12a of the infrared transmission window part 12 with the heat. The contact surfaces 11a and 12a are in the fixed state joined with each other by the existence of the melt parts 14 and 15 and the pressure. Here, the contact surfaces are combined in the molecular level, since the infrared transmission window part 12 and the case main part 11 are made of the same resin material to be the main as the main resin material. As a result, the infrared transmission window part 12 and the case main part 11 are in the state where they are unified in the molecular level.

In addition, the case 10 is made of the infrared transmission window part 12 and the case main part 11 joined and fixed with each other so that the case interior space 10S in which the infrared device 2 is accommodated is in a tightly sealed state. The case interior space 10S is in the tightly sealed state, although there may be a wiring extended outside from the case main part 11 for outputting and inputting a signal.

Thus, the infrared transmission window part 12 is made of the light transmitting resin for a laser welding. Near-infrared laser is used for the laser welding. In this case, it is common to manage the transmissivity in the objective wavelength band at the time of molding the light transmitting resin material, in order to certainly perform the laser welding. The present disclosure is realized using the transmissivity-managed material which will function as the infrared transmission window part 12 by paying attention to that the wavelength band of the laser welding and the wavelength band used by the infrared transmission overlap with each other.

Moreover, in the present embodiment, the infrared transmission window part 12 and the case main part 11 are made of the same material in the main resin material to be main. As mentioned above, since the severe transmissivity management is carried out, the light transmitting resin material can function as a window part with the stable characteristics. Further, the size can be made smaller, since a conventional structure for fitting a window part as a separate component to an opening in the case main part becomes unnecessary. In case where the infrared light irradiation with a wide angle is required, as shown in FIGS. 2-4, it is easy to widely form the infrared transmission window part 12 in the case 10. A conventional case has a demerit that it is necessary to separately mold a window part as a separate component with expensive material in order to form a large window part. Furthermore, in the present embodiment, the case 10 can be made to have the tightly sealed structure, such that there is no boundary between the infrared transmission window part 12 and the case main part 11, since the welding of resin is certainly made by laser welding. Thereby, the function of waterproof with protection against dust can be provided without special parts and structure.

The embodiment mentioned above is just an aspect in the present disclosure, and the present disclosure is not limited to the embodiment. The embodiment may be modified based on knowledge of a person skilled in the art, for example, by omitting a part of constituent elements or by adding other constituent element.

The case main part 11 may be made of other resin other than the light absorbing resin, and may be fixed to the infrared transmission window part 12 by a method other than the laser welding.

Moreover, the case 10 may be formed such that the case interior space 10S is not necessarily be in the tightly sealed state.

In case where the case main part 11 is made of light absorbing resin and where the infrared transmission window part 12 is made of light transmitting resin, the main material may be made different between them, while it is possible to perform a welding by near-infrared laser.

The infrared device 2 can be mounted to any of the case main part 11 and the infrared transmission window part 12.

Figure 6:
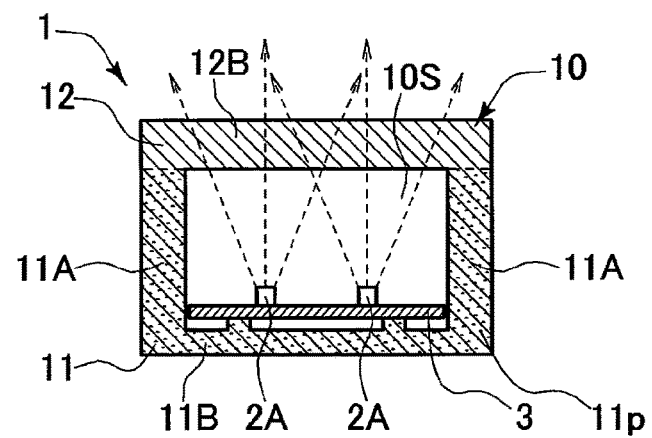
FIG. 6 is a schematic sectional view illustrating a first modification of the infrared apparatus of FIG. 1, at the same section as the central perpendicular section (A-A section) of FIG. 1.
Figure 7:
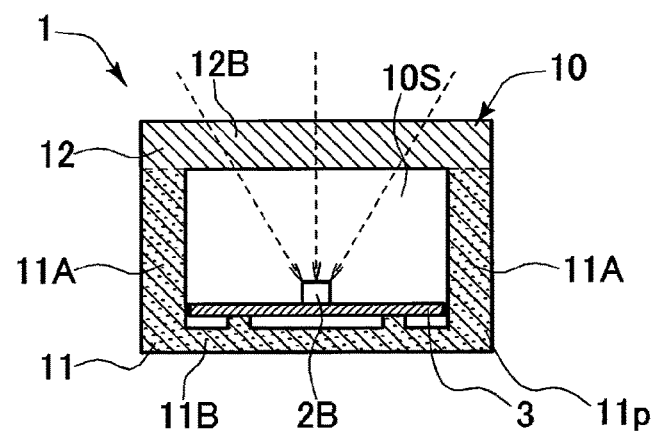
FIG. 7 is a schematic sectional view illustrating a second modification of the infrared apparatus of FIG. 1, at the same section as the central perpendicular section (A-A section) of FIG. 1.
Figure 8:
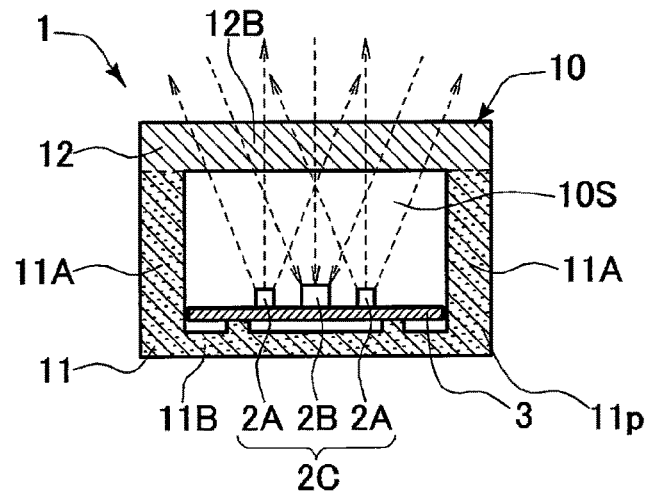
FIG. 8 is a schematic sectional view illustrating a third modification of the infrared apparatus of FIG. 1, at the same section as the central perpendicular section (A-A section) of FIG. 1.
Figure 9:
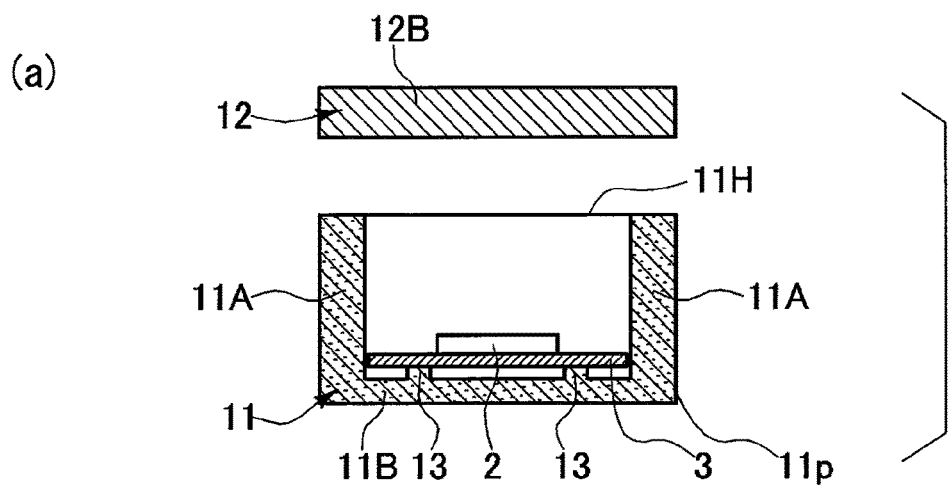
FIG. 9 is an explanatory view illustrating a flow of method for assembling the infrared apparatus of FIGS. 6-8, using the same section as the central perpendicular section (A-A section) of FIG. 1.
Figure 9:
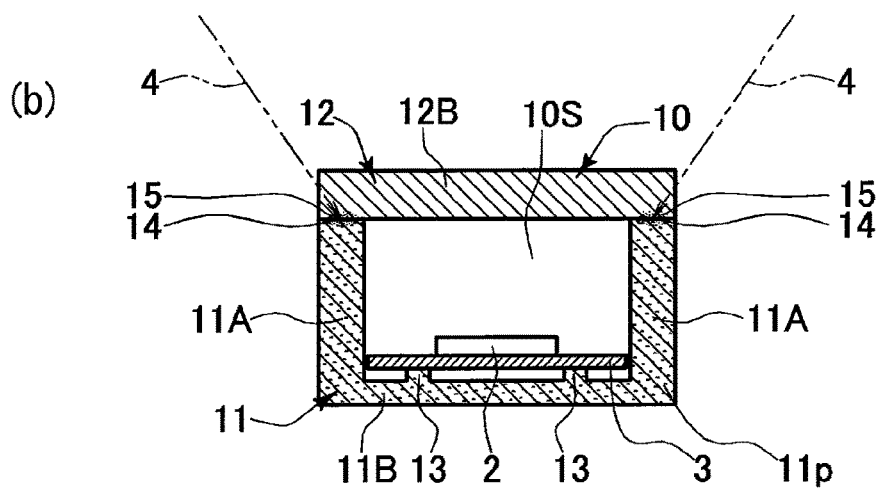
Figure 9:
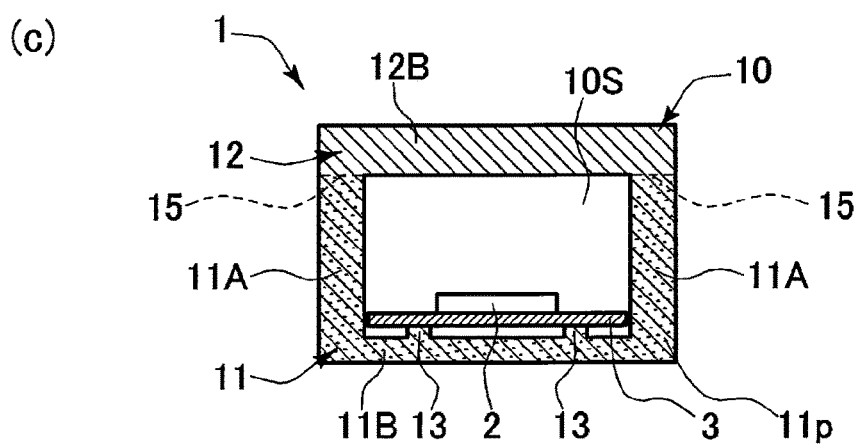

As shown in FIG. 9, the infrared transmission window part 12 may be joined and fixed to the box-shaped case main part 11 having the wall part 11A extending higher than the infrared device 2 by being arranged to close the opening 11H on the side of the transmission direction of infrared rays. That is, as shown in FIGS. 6-8, the case main part 11 is shaped in a box in which the upper side is opened at the center to include a cylindrical wall part 11A and a lower end part 11B, The cylindrical wall part 11A extends downward from the outer periphery of the lower surface of the infrared transmission window part 12 which defines a board-shaped lid part. The lower end part 11B opposes the infrared transmission window part 12 through the case interior space 10S at the lower end of the cylindrical wall part 11A. The infrared device 2 mounted on the circuit board 3 is arranged and fixed inside the case main part 11 with the upper open space. The circuit board 3 is disposed onto the plural projection parts 13 projected from the upper surface of the lower end part 11B, and the projection part 13 and the circuit board 3 are fixed by a fastening member such as a screw. In this case, when the case main part 11 is made of light absorbing resin with low infrared transmitting property, the infrared rays can be mostly restricted from passing through the wall part 11A which surrounds the infrared device 2 on the outer periphery side. Thereby, infrared rays can be output and input with a fixed directivity within a narrow irradiation angle range.

In addition, also in the embodiment of FIGS. 6-8, the method of joining and fixing the infrared transmission window part 12 and the case main part 11 can be performed similarly to FIG. 5, as shown in FIG. 9.

In addition, similarly to the embodiment of FIGS. 6-8 in which the infrared transmission window part 12 has the board shape, the box-shaped case main part 11 with the short wall part 11A may have no wall part 11A in the embodiment of FIGS. 2-4.

Moreover, in all the embodiments, the wall part 11A, 12A, 12B having the contact surface 11a, 11b to which the near-infrared laser is irradiated is located at the most outside where the external surface of the infrared apparatus 1 is exposed outside, such that there are advantages that it is easy to set the irradiation point of near-infrared laser and that near-infrared laser can be directly irradiated.

The invention claimed is:

1. An infrared apparatus comprising:
a case having an interior space; and
an infrared device received in and tightly sealed within the case and configured to input and/or output infrared rays, wherein
the case has
an infrared transmission window part through which visible light does not pass and through which infrared light passes, the infrared transmission window part is made of a light transmitting resin through which near-infrared laser rays used for near-infrared laser welding pass,
a case main part is made of a near-infrared light absorbing resin which emits heat and melts when receiving the near-infrared laser,
each of the infrared transmission window and the case main part has a contact surface, the infrared device is arranged in the interior space of the case with the contact surface of the infrared transmission window adjoining the contact surface of the case main part, and
the infrared transmission window part and the case main part are directly fixed and joined to each other at a molecular level by the near-infrared laser rays passing through the infrared transmission window and heating and melting a portion of the case main part adjacent the contact surface of the case main part.

2. The infrared apparatus according to claim 1, wherein the light transmitting resin and the light absorbing resin consist essentially of a common resin material.

3. The infrared apparatus according to claim 2, wherein the common resin material has low warpage.

4. The infrared apparatus according to claim 2, wherein the common resin material comprises polybutylene terephthalate resin.

5. The infrared apparatus according to claim 1, wherein the infrared device is mounted on the case main part.

6. The infrared apparatus according to claim 1, wherein the infrared device is mounted on an upper surface of the case main part which forms a bottom part of the case, the infrared transmission window part has
a cylindrical wall part extending upward from an outer periphery of the case main part, and
an upper end part joined to an upper end of the cylindrical wall part and opposing the case main part through the case interior space of the case, and
the infrared transmission window part forms a lid part of the case.

7. The infrared apparatus according to claim 1, comprising a plurality of infrared devices, each infrared device being configured to input and/or output infrared rays.

8. The infrared apparatus according to claim 1, comprising at least one infrared input device configured to receive infrared rays and at least one infrared output device configured to output infrared rays.

9. The infrared apparatus according to claim 1, wherein a seal between the infrared transmission window part and the case formed by the welding the near-infrared laser is waterproof - protection against dust.

10. The infrared apparatus according to claim 1, wherein the infrared transmission window part cuts off the visible light when the infrared device received in the case inputs and/or outputs infrared rays, and
the near-infrared laser welding has a wavelength band which overlaps with that of the infrared light able to pass through the infrared transmission window part through which only the infrared light passes.

11. The infrared apparatus according to claim 1, wherein the heating and melting of the portion of the case main part adjacent the contact surface of the case main part also heats and melts a portion of the infrared transmission window part adjacent the contact surface of the infrared transmission window part, and the contact surfaces of the case main part and the infrared transmission window part are pressed together while melted.

* * * * *